United States Patent
Kabiljo et al.

(10) Patent No.: US 10,025,867 B2
(45) Date of Patent: Jul. 17, 2018

(54) CACHE EFFICIENCY BY SOCIAL GRAPH DATA ORDERING

(71) Applicant: Facebook, Inc., Menlo Park, CA (US)

(72) Inventors: Igor Kabiljo, Palo Alto, CA (US); Laxman Dhulipala, Cupertino, CA (US); Alon Michael Shalita, Menlo Park, CA (US); Arun Dattaram Sharma, Union City, CA (US); Brian Christopher Karrer, Silver Spring, MD (US)

(73) Assignee: Facebook, Inc., Menlo Park, CA (US)

( * ) Notice: Subject to any disclaimer, the term of this patent is extended or adjusted under 35 U.S.C. 154(b) by 340 days.

(21) Appl. No.: 14/869,656

(22) Filed: Sep. 29, 2015

(65) Prior Publication Data

US 2017/0091334 A1   Mar. 30, 2017

(51) Int. Cl.
  *G06F 17/30*   (2006.01)
(52) U.S. Cl.
  CPC .... *G06F 17/30867* (2013.01); *G06F 17/3053* (2013.01); *G06F 17/30584* (2013.01); *G06F 17/30876* (2013.01); *G06F 17/30958* (2013.01); *G06F 17/30961* (2013.01)
(58) Field of Classification Search
  CPC ........ G06F 17/30867; G06F 17/20958; G06F 17/3053; G06F 17/30961; G06F 17/30876; G06F 17/30584; G06F 17/30958
  USPC ....... 707/715, 736, 737, 791, 797, 798, 800, 707/802, 812, 830, 959, E17.011; 711/113, 126, 129, 130, 153; 705/319
  See application file for complete search history.

(56) References Cited

U.S. PATENT DOCUMENTS

| | | | | |
|---|---|---|---|---|
| 8,364,717 | B2* | 1/2013 | Delling | G06F 17/30533 707/798 |
| 9,208,207 | B2* | 12/2015 | Venkataramani | G06F 17/3048 |
| 2012/0317092 | A1* | 12/2012 | Roh | G06F 17/30592 707/713 |
| 2013/0198191 | A1* | 8/2013 | Lara Hernandez | G06F 17/30867 707/737 |
| 2014/0320497 | A1* | 10/2014 | Vojnovic | G06T 11/206 345/440 |

(Continued)

OTHER PUBLICATIONS

Li-Yung Ho et al., Distributed Graph Database for Large-Scale Social Computing, 2012 IEEE Fifth International Conference on Cloud Computing, pp. 455-462 (Year: 2012).*

*Primary Examiner* — Greta L Robinson
(74) *Attorney, Agent, or Firm* — FisherBroyles, LLP

(57) ABSTRACT

Embodiments are disclosed for improving cache or memory efficiency of a social network system. A method according to some embodiments includes steps of: receiving an instruction to improve cache or memory efficiency of social graph data of a social graph; generating based on the social graph a partitioning tree including multiple bottom-level buckets, the partitioning tree dividing the vertices of the social graph into the bottom-level buckets and ordering the bottom-level buckets such that a social network metric regarding the vertices is optimized; assigning user IDs to the vertices of the social network in a numerical sequence based on the ordering of the bottom-level buckets; storing the social graph data of the users in storage locations in an order according to the numeral sequence of the assigned user IDs of the vertices.

19 Claims, 9 Drawing Sheets

(56) References Cited

U.S. PATENT DOCUMENTS

2015/0100574 A1\* 4/2015 Presta ............... G06F 17/30584
707/737

\* cited by examiner

CACHE EFFICIENCY BY SOCIAL GRAPH DATA ORDERING

BACKGROUND

Traditional social networking services store social graph data in data shards either randomly or according to a sequence in which corresponding user accounts are created. Each data shard is a partition of data in a database for the social graph. The data shards are stored in separate database server instances to spread data access load. A traditional social networking service also includes a mapping data structure to map user identifications (IDs) of the social networking users to the data shards which store the social graph data of the users. When the social networking service receives a request for accessing data associated with multiple related users, the social networking service determines the storage locations based on the mapping data structure and retrieves data from various locations of the data shards. The cache for the data shards is ineffective, because the data associated with the related users are typically not stored together.

DETAILED DESCRIPTION

The disclosed embodiments reorder the storage locations of social graph data of users on the data shards based on "social similarity" or relationships of the users. Social similarity refers to similarity between users' social network attributes. By exploiting the social similarity of the users from the social graph, the social graph data reordering system places social graph data of socially similar users close to each other. The social graph data reordering system reorders the data by assigning each social graph vertex (which represents a social graph user) an alternative user ID, such that related or similar social network users have alternative user IDs that are numerically close to each other. The alternative user IDs may have no relationship with the original user IDs that are assigned to the social network users when the user accounts are created.

The social graph reordering system uses the alternative user ID framework to reduce the overall social graph data size and to improve cache efficiency of various social context operations. The alternative IDs of social graph vertices are ordered so that the IDs of relevant vertices are close. The information of the social graph is stored in the data shards based on the sequence of the alternative IDs. Thus, information of the related vertices is likely to be accessed together with improved caching efficiency.

The social graph reordering system partitions the social graph using, e.g., a recursive binary partitioner. The social graph is partitioned into two parts. The partitioning recursively splits each child bucket until a suitable number of buckets is achieved. The social graph reordering system can further swap the child buckets within the binary tree to optimize for a metric, such as log cost or log gap cost. A log cost of an edge between two vertices is defined to be a logarithm (with a base of, e.g., 2) of the distance between the two vertices. A log gap cost for a particular vertex is the summation of differences between consecutive pairs of sorted vertices that are adjacent to that particular vertex (assuming the vertices are sorted in an ascending order). Alternative IDs will be determined based on the sequence of the buckets at the bottom of the binary tree. Information of the social graph is then stored in locations (e.g., data shards) according to the sequence of the alternative IDs. Social graph data of socially related or socially similar vertices are then caused to be more likely stored close to each other under the framework. The social graph reordering system thus improves storage block cache efficiency and CPU cache efficiency because closely stored relevant vertices can be cached together. The system is scalable to a large social graph (e.g., a social graph having billions of vertices).

Alternative User IDs

Figure 1:
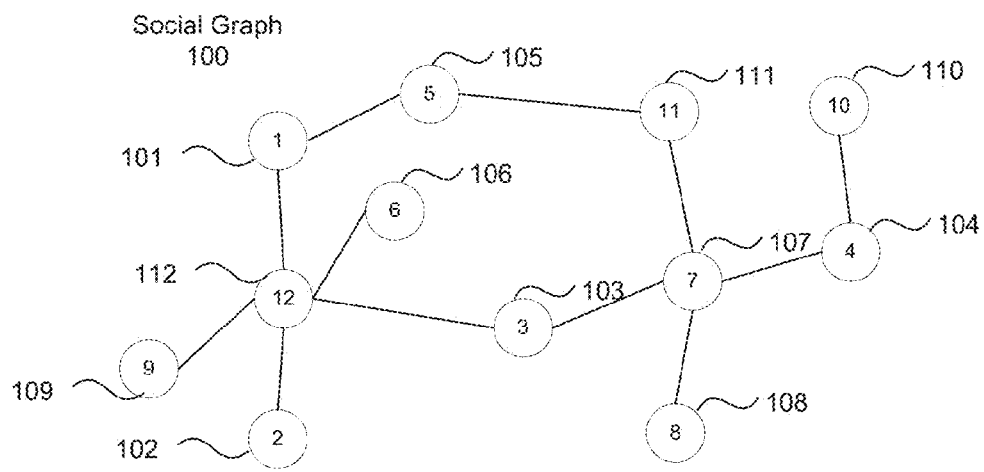
FIG. 1 is a block diagram illustrating a social graph of vertices with original user IDs and data shards storing the social graph data of vertices.

FIG. 1 illustrates a social graph of vertices with original user IDs and data shards storing the social graph data of vertices. The social graph 100 includes multiple vertices 101-112. Each vertex represents a user of the social network system. The lines interconnecting vertices represent the friendly relationships between users. For example, the line interconnecting vertices 101 and 105 indicates that the users represented by vertices 101 and 105 are friends in the social network system.

The social network system assigns original user IDs to the users when the user accounts are created. FIG. 1 shows the assigned original user IDs in the circles of the vertices. The original user IDs do not necessarily have any particular numerical order. For example, the original user IDs can follow an order based on the relative times when the user accounts were created. Alternatively, the original user IDs can be randomly generated numerical numbers. Either way, the numerical order of the original user IDs have no relevance or correlation with the relationships between vertices 101-112 in the social graph 100.

FIG. 1 further illustrates the data shards 130 and 140 for storing the social graph data of vertices 101-112. The data shards 130 and 140 store the social graph data of vertices in the storage space based on the numerical sequence of the original user IDs of the vertices. For example, the social graph data of the vertex 101 with original user ID 1 (also referred to as "user 1") is stored at the beginning of the storage space of data shard 130. The social graph data of the vertex 112 with original user ID 12 (also referred to as "user 12") is stored at the end of the storage space of data shard 140.

Because the numerical order of the original user IDs has no relevance or correlation with the relationships of vertices 101-112 in the social graph 100, and because the data of vertices are stored based on the numerical order of the original user IDs of the vertices, the storage order of the vertices in data shards 130 and 140 has no relevance or correlation with the relationships of vertices 101-112 in the social graph 100. For example, users 1 and 2 are friends of user 12. However, data of user 12 is stored at the end of data shard 140, whereas data of users 1 and 2 are stored at the beginning of data shard 130. When the social network system fetches data for users 1, 2 and 12 who are friends, the social network system needs to access different data shards 130 and 140.

In some embodiments, a social graph reordering system assigns each vertex in a social graph an alternative ID such that the vertex's alternative ID is numerically close to alternative IDs of its adjacent vertices in the social graph. The social graph data of the vertices are stored according to the numeral sequence of the alternative IDs. Such an arrangement can significantly improve the memory efficiency of the social networking system.

For example, the social networking system receives a request for social graph data that have social context, e.g., "fetch today's posts for all my social network friends." The social network friends are related and therefore have numerically close alternative IDs. Thus, the social graph data of these closely related social network friends are stored closely due to the numerically close alternative IDs. The social network system likely accesses these closely stored social graph data of friends together as they are likely stored together in memory or storage of the social network system. Similarly, reordering the social graph vertices so that users and their friends have close alternative IDs can significantly decrease the amount of space needed when the system difference-encodes adjacency lists.

Figure 2:
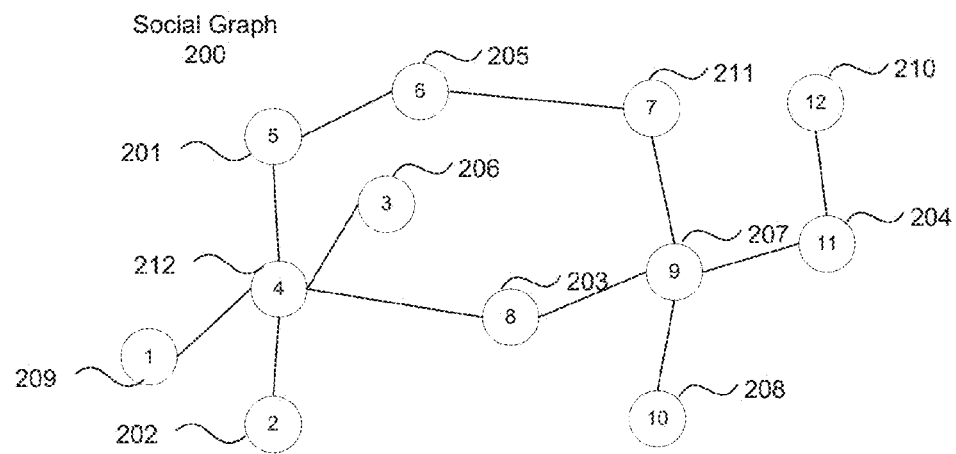
FIG. 2 is a block diagram illustrating a social graph of vertices with alternative user IDs and data shards storing the social graph data of vertices.

FIG. 2 illustrates a social graph of vertices with alternative user IDs and data shards storing the social graph data of vertices. Similar to the social graph 100 illustrated in FIG. 1, the social graph 200 includes multiple vertices 201-212. Each vertex represents a user of the social network system. The lines interconnecting vertices represent the friendly relationships between users. For example, the line interconnecting vertices 201 and 205 indicates that the users represented by vertices 201 and 205 are friends in the social network system.

Instead of using the original user IDs as illustrated in FIG. 1, the social graph reordering system assigns each vertex in the social graph 200 an alternative ID such that the vertex's alternative ID is numerically close to alternative IDs of its adjacent vertices in the social graph 200. For example, vertices 212 and 201 represent two friends in the social graph 200, and are assigned with alternative IDs of 4 and 5 respectively. Vertices 203 and 207 also represent two friends in the social graph 200, and are assigned with alternative IDs of 8 and 9 respectively. Thus, the alternative user IDs are assigned such that adjacent vertices are numerically close to each other. In other words, the numeral order of the alternative user IDs has relevance and correlation with the relationship of vertices 201-212 in the social graph 200.

FIG. 2 further illustrates the data shards 230 and 240 for storing the social graph data of vertices 201-212. The data shards 230 and 240 store the social graph data of vertices in the storage space based on the numerical order of the alternative user IDs of the vertices (instead of the numerical order of the original user IDs of the vertices as illustrated in FIG. 1). For example, vertices 209, 202, 206 and 201 (with alternative IDs 1, 2, 3 and 5, respectively) are adjacent to vertex 212 (with alternative ID 4). In data shard 230, the social graph data of users of alternative IDs 1, 2, 3 and 5 are stored in storage space close to where the social graph data of user of alternative ID 4 is stored. Similarly, vertices 211, 203, 208 and 204 (with alternative IDs 7, 8, 10 and 11, respectively) are adjacent to vertex 207 (with alternative ID 9). In data shard 240, the social graph data of users of alternative IDs 7, 8, 10 and 11 are stored in storage space close to where the social graph data of user of alternative ID 9 is stored.

Log Cost and Log Gap Cost Metrics

The social graph reordering system can determine and generate the alternative IDs by minimizing either a metric called log cost or a metric called log gap cost. A log cost of an edge between two vertices is defined to be a logarithm (with a base of, e.g., 2) of the distance between the two vertices. The distance between two vertices can be correlated to, e.g., a difference of the alternative IDs between these two vertices in the social graph. For example, the vertices 212 and 205 illustrated in FIG. 2 are socially similar since their alternative IDs 4 and 6 are close. In other words, using the log cost, the social graph reordering system tries to minimize the distance between a user and his or her friends. A log cost of a social graph is the average (or total) log cost over all edges in the social graph.

For log gap cost, assuming the vertices are sorted in an ascending order, the log gap cost for a particular vertex is the summation of differences between consecutive pairs of sorted vertices that are adjacent to that particular vertex. In other words, using the log gap cost, the social graph reordering system tries to minimize the distances between users who are friends of a particular user. The log cost of a social graph is the average (or total) log gap cost over all vertices.

The minimization of log gap cost is particularly useful in some scenarios where the system prefers that the friends of a user are stored closely. For example, when a user of a social network system logs in, the social network system needs to fetches information about the friends of that user and outputs the information about his or her friends. These friends of that user are not necessarily friends of each other; they just form a friend list of that user. Data of these vertices are stored closely based on the alternative user IDs. The storage space may store the difference between neighboring vertices, instead of the actual data of the vertices. Since these neighboring vertices are similar vertices that form a friend list of a user, then it takes less space to store the data because the neighboring vertices are similar and have less differences.

Recursive Partitioning Tree

The social graph reordering system uses a balanced partitioning as a recursive binary partitioner. The social graph reordering system first partitions the vertices of an entire social graph into two vertex buckets. The social graph reordering system then splits each vertex bucket until the system achieves a suitable number of vertex buckets. During the partitioning process, the system can further move the buckets within some levels of the partitioning tree (e.g., within 3 levels). The movement of buckets corrects suboptimal decisions during the partitioning process. The social graph recording system thus produces a binary partitioning tree for dividing the social graph into a sequence of vertex bucket. The vertices in buckets in a subtree below a given tree node are more socially connected than vertices in buckets outside of that subtree. Alternative user IDs can be assigned based on the sequence of the vertex bucket at the bottom level of the partitioning tree.

The reordering can be used in various aspects of the social network system. The alternative IDs can be used to determine the data shards which store the social graph data of users, to significantly improve the memory-cache hit rates for social context queries (e.g., friend-related queries). In some embodiments, the social network system can apply the reordering based on demographic information. For social network features having lots of homophily (e.g., country, or age), the alternatively IDs based on these features having much lower entropy than the randomly assigned original user IDs. Thus, reordering of the social graph data based on these features can significantly reduce the storage space for storing the social graph data (when the data are difference-encoded). In some embodiments, the storage space for storing social graph data of a social network is reduced from 2.3 TB to 1.0 TB, after applying the reordering scheme based on alternative IDs.

In one example, the social graph reordering system uses cities as the social graph feature for partitioning the social graph and assigning the alternative IDs. The storage space needed for storing the social graph data reduces from 22 bits/edge (an edge is a relationship between two vertices) to 17 bits/edge. The bits/edge is measured by an average bits required when a friend list is difference-encoded.

Figure 3:
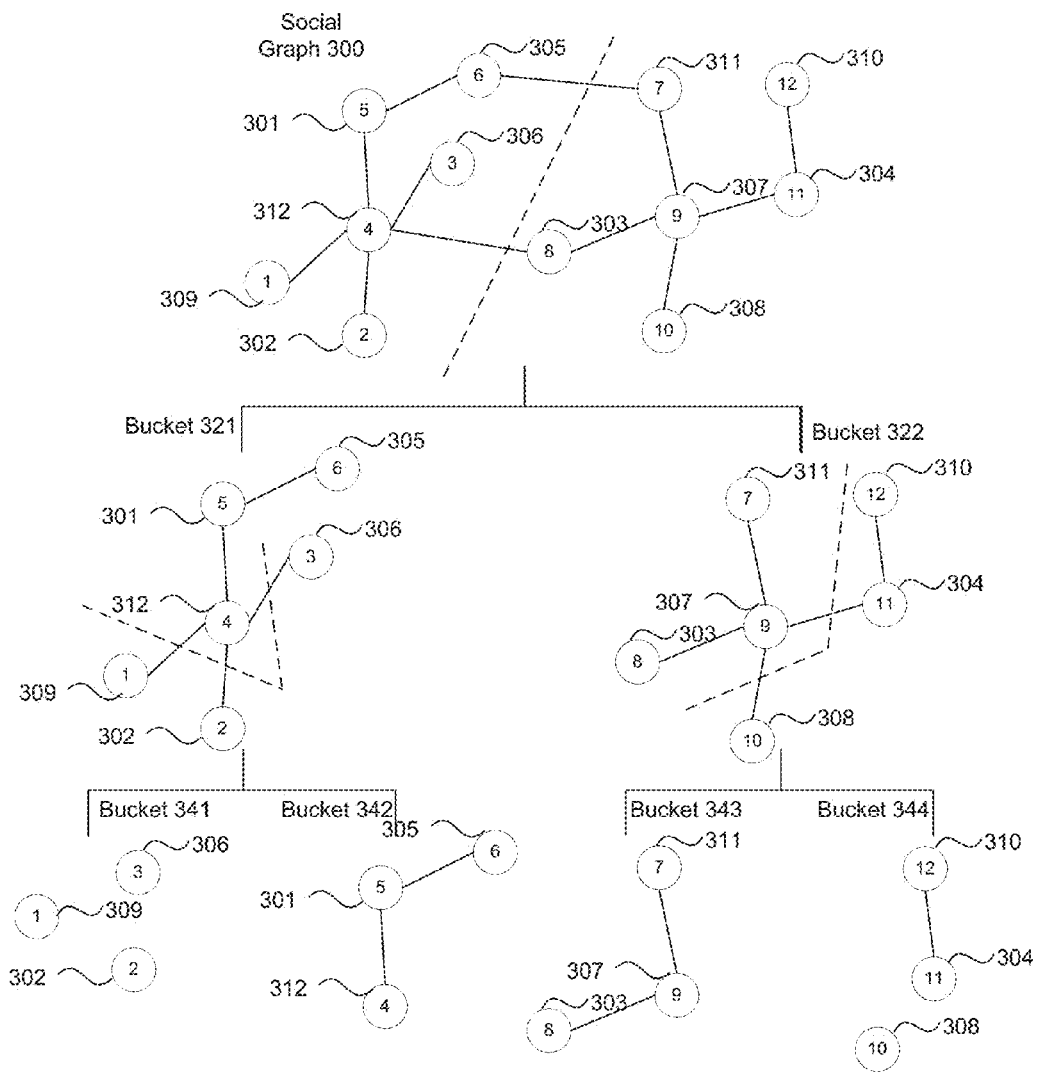
FIG. 3 is a block diagram illustrating a process of recursive partitioning of a sample social graph and assigning alternative user IDs based on the partitioning.

FIG. 3 illustrates a process of recursive partitioning of a sample social graph and assigning alternative user IDs based on the partitioning. The social graph 300 is similar to the social graph 200 illustrated in FIG. 2. The social graph 300 includes multiple vertices 301-312. Each vertex represents a user of the social network system. The lines interconnecting vertices represent the friendly relationships between users.

The social graph reordering system takes the whole social graph 300, and divides the social graph 300 into two buckets 321 and 322. For each vertex in the social graph 300, the social graph recording system makes a discrete assignment of the vertex into one of these two buckets 321 and 322. The social graph reordering system can try different ways of dividing up the social graph 300 and chooses the division which minimizes a metric such as log cost or log gap cost of the social graph 300.

For example, if the social graph reordering system determines the division by minimizing the log cost metric, the social graph reordering system basically minimize the edge locality of the graph. In other words, adjacent vertices tend to stay in the same bucket. For example, vertex 312 and most of its adjacent vertices 309, 302, 306 and 301 fall into the same bucket 321. Vertex 307 and its adjacent vertices 311, 303, 308 and 304 fall into the same bucket 322. Alternatively, the social graph reordering system can determine the division of graph 300 by minimizing the log gap cost metric. The friends of a user tend to fall into as few buckets as possible.

The social graph reordering system further divides up the buckets 321 and 322 into buckets 341, 342, 343 and 344. The social graph reordering system determines the divisions of buckets 321 and 322, by minimizing e.g., the log cost metric or the log gap cost metric. For example, the bucket 321 is divided into a bucket 341 including vertices 309, 302 and 306, and a bucket 342 including 312, 301 and 305. The social graph reordering system can use different metrics for different levels of the partitioning tree. For example, the social graph reordering system may divide graph 300 into buckets 321 and 322 based on the log cost metric, and then divide buckets 321 and 322 into buckets 341, 342, 343 and 344 based on the log gap cost metric.

The social graph reordering system determines an ordering of the buckets at each tree level based on the tree structure and further based on a swapping process. First, because bucket 321 is divided into buckets 341 and 342 and because bucket 322 is divided into buckets 343 and 344, the buckets 341 and 342 are before buckets 343 and 344 in the ordering of the bucket at that level. In order to determine the ordering sequence between buckets 341 and 342, the swapping process tries two possible configurations. In one configuration, bucket 341 is before bucket 342. In the other configuration, bucket 342 is before bucket 342.

For each configuration, the swapping process samples a number of representative vertices from the social graph 300, and calculates the target metric (e.g., log cost or log gap cost) for the representative vertices. The representative vertices can be, e.g., some or all of the vertices of the buckets 341 and 342. The swapping process then picks the configuration of buckets 341 and 342 with the minimum target metric for the representative vertices. Similarly for buckets 341 and 342, the swapping process determines the ordering sequence of buckets 343 and 344 based on the target metric for the representative vertices for two different configurations.

The swapping process does not affect the topological relationship of the buckets within the partitioning tree, other than the ordering sequence of the buckets. Therefore, the social graph reordering system can conduct the swapping process after the entire partitioning tree is generated. Alternatively, the social graph reordering system can conduct a swapping process for a bucket level when the buckets of that level are determined, before determining buckets of the next level.

The social graph reordering system can continue to perform the divisions of buckets recursively, until the sizes of the bottom-level buckets reach a desired level of granularity. For example, as illustrated in FIG. 3, the social graph reordering system determines that the sizes of the bottom-level buckets 341, 342, 343 and 344 reach the size of three vertices and therefore achieves the desired level of granularity. Then the social graph reordering system assigns the alternative user IDs in a numerical sequence based on the sequences of the bottom-level buckets 341, 342, 343 and 344.

Within the bucket 341, 342, 343 or 344, the sequence of the alternative user IDs can be determined in various ways. For example, the social graph reordering system can determine the sequence of the alternative user IDs of vertices 309, 302 and 306 of bucket 341, e.g., based on a random sequence or based on the numerical sequence of the original user IDs of the vertices 309, 302 and 306.

For example, the alternative user IDs of vertices 309, 302, 306 in bucket 341 are smaller than the alternative user IDs of vertices 312, 301 and 305 in bucket 342. The alternative user IDs of vertices 312, 301, 305 in bucket 342 are smaller than the alternative user IDs of vertices 311, 303 and 307 in bucket 343. The alternative user IDs of vertices 311, 303, 307 in bucket 343 are smaller than the alternative user IDs of vertices 308, 304 and 310 in bucket 344. The table at the bottom of FIG. 3 shows the assigned alternative user IDs of the vertices 301-312 in one example.

Although the sample process illustrated in FIG. 3 generates a binary partitioning tree, in various embodiment, the nodes of the partitioning tree (other than the bottom-level nodes) can have arbitrary and various numbers of branches. For example, some nodes of the partitioning tree can have two branches respectively like the binary partitioning tree. Some nodes of the partitioning tree can have one branch, meaning those nodes are not divided at corresponding levels. Some nodes of the partitioning tree can have more than two branches.

Moving Vertices Between Buckets in a Partitioning Tree

The social graph reordering system can further identify vertices that fall into buckets based on sub-optimal decisions and can correct the sub-optimal decisions by moving the identified vertices buckets within some levels of the partitioning tree (e.g., 2 or 3 levels). The social graph reordering system can conduct the vertex moving process after the entire partitioning tree is generated. Alternatively, the social graph reordering system can conduct a vertex moving process when the buckets of a particular level are determined, before determining buckets of the next level.

For example, at some point, the social graph reordering system looks for sub-optimal vertices in a section of the partitioning tree. The section starts with a bucket and includes branches of that bucket down to, e.g., 2 levels. For example, a section may include the bucket 321 (the ancestor node of the section), 341 and 342 (the bottom-level node of the section), as illustrated in FIG. 3. The social graph reordering system then exams the vertices in the buckets 341 and 342, which are bottom-level buckets within that section (not necessarily the bottom-level of the entire partitioning tree). The social graph reordering system can identify a sub-optimal vertex in the bucket 341, e.g., a vertex which have many friends allocated in bucket 342. The social graph reordering system then determines whether the target metric (e.g., log cost or log gap cost) will be further minimized if the sub-optimal vertex is moved into another bottom-level bucket within this section (e.g., bucket 342). If so, the social graph reordering system corrects the sub-optimal decision by moving the sub-optimal vertex into bucket 342, such that the overall target metric is further minimized.

Updating Partitioning Tree and Alternative IDs

When the social graph has been changed, e.g., due to an added user, the social graph reordering system can update the partitioning tree and the alternative user ID scheme accordingly. The social graph reordering system can add the user (e.g., at the end of the sequence of the users) to the social graph (e.g., last bucket), and re-computes the partitioning tree using the previous partitioning tree as initialization. Because the previous partitioning tree is a quality result optimizing the target metric, after several iteration, the new partitioning tree can be achieved with little changes.

The new alternative ID scheme can be generated based on the new partitioning tree. Again, the new alternative ID scheme may have only some minor changes as compared to the new alternative ID scheme. The process of updating the partitioning tree and alternative user IDs can be performed at certain frequencies, e.g., every week, or every day.

Applications Using Alternative User IDs

As discussed above, the social graph reordering system determines the partitioning tree and assigns the alternative user IDs based on the ordering sequence of the bottom-level buckets of the partitioning tree. The alternative user IDs are assigned such that relevant vertices have alternative user IDs that are close to each other. The social network system can utilize the alternative user ID scheme to improve various type of performance of the social network system. For example, reordering of the shard storage based on the alternative user IDs can significantly decrease cache-miss rate for fetching the social graph data. The space utilization of the storage space can also be improved.

In some embodiments, the social network system includes flash memories as storage devices for storing social graph data of the users. The flash memories are divided into blocks. Blocks in flash memories can have, e.g., a hundred to a thousand bytes. The time needed to access any portion of the data of the block is the same time needed to access all of the data of the block. So the time needed for fetching social network data of multiple users depends on the number of flash memory blocks that store the data of those users. The fetching time will be reduced if data of multiple relevant users are stored in the same flash memory block. Since it is common that a social network system fetch data of a group of relevant or similar users together (e.g., for news feeding or advertising), the performance can be improved to fetch some of these relevant or similar users from the same flash memory block.

The social network system can store the social graph data based on numerical sequence of the alternative user IDs. The social graph reordering system can set the size of bottom-level buckets in the partitioning tree as roughly the number of users that can fit into a single flash block. Then the social graph reordering system optimizes the metric, e.g., log gap cost for the vertices, to ensure that a request for information of friends of a user hit as few cache blocks as possible. There is a better chance that data of relevant or similar users are stored in the same flash memory and can be fetched together. Thus, the cache miss rate is reduced.

The technology can improve cache miss rate for memories or CPU caches other than flash memories as well. Because related users are adjacently stored in the memories, the system also receives benefit to the cache hierarchy as well. For example, for CPU cache lines from L1 to L2. It is likely that relevant users are fetched on that same cache line. So there is a significant improvement in the memory hierarchy as well. Based on this alternative user ID scheme, the cache performance is improved.

The size of the bottom-level buckets in the partitioning tree can be at least comparable to the flash memory blocks or the section size of the storage device. If the granularity of the partitioning tree is significantly smaller than the device section size, this ensures that the effectiveness of the alternative user ID scheme at the expense of upfront computational cost of the more granular partitioning tree. The partitioning tree can be generated offline when the system is not serving data requests.

The system can also be applied to mechanical spinning storage disks such as the ones used in traditional mechanical hard drives. The system can lay the social graph data according to the numerical sequence of the alternative user IDs. This also reduces the time spent to seek. If the data location is far away, it takes more time to seek. When the data of relevant users are stored together, the system further reduces the time to fetching the data including the seek time. In some embodiments, the system can also be applied to solid-state drives (SSDs).

Sample Process

Figure 4:
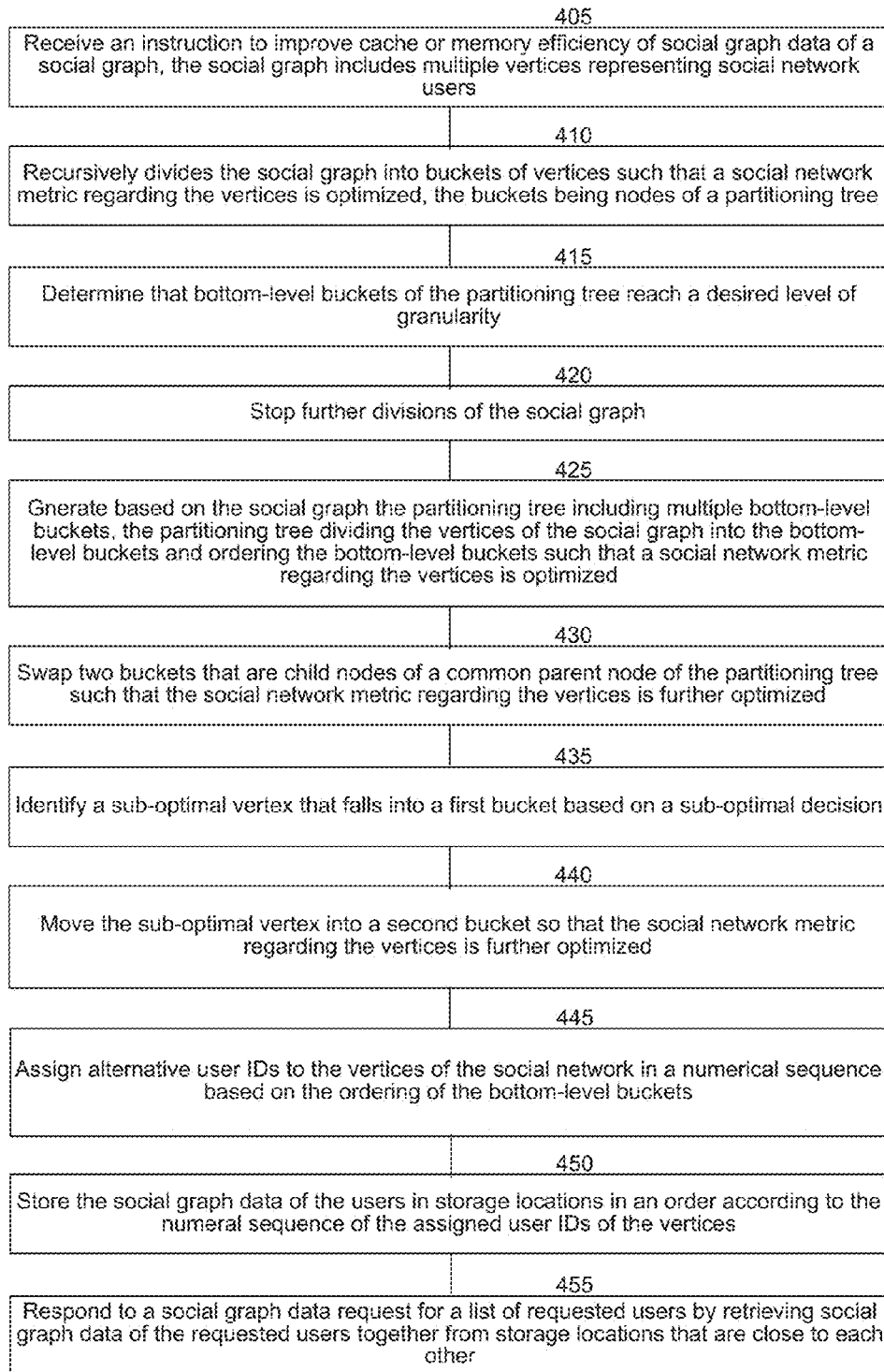
FIG. 4 is a flow diagram illustrating a sample process for improving cache or memory efficiency of a social network system.

FIG. 4 illustrates a sample process for improving cache or memory efficiency of a social network system. At block 405 of the process 400, the system receives an instruction to improve cache or memory efficiency of social graph data of a social graph. The social graph includes multiple vertices representing social network users. Some of the social network users can be friends in a social network. In some embodiments, the social graph data of the vertices are stored in blocks of storage devices (e.g., flash memory devices).

At block 410, the system recursively divides the social graph into buckets of vertices such that a social network metric regarding the vertices is optimized, the buckets being nodes of a partitioning tree. At block 415, the system determines that bottom-level buckets of the partitioning tree reach a desired level of granularity. At block 420, the system stops further divisions of the social graph.

At block 425 of the process 400, the system generates based on the social graph the partitioning tree including multiple bottom-level buckets, the partitioning tree dividing the vertices of the social graph into the bottom-level buckets and ordering the bottom-level buckets such that a social network metric regarding the vertices is optimized. The size of the bottom-level blocks of the partitioning tree can be substantially equal to or less than a block size of the blocks of the storage devices. In some embodiments, the partitioning tree is a binary partitioning tree, and the nodes of the binary partitioning tree have two branches respectively.

In some embodiments, the social network metric can be a log cost of the vertices of the social graph to be minimized. The vertices representing friend users tend to stay in the same bucket among the bottom-level buckets corresponding to the minimized log cost of the vertices of the social graph. In some embodiments, the social network metric can be a log gap cost of the vertices of the social graph to be minimized. The vertices representing friends of a particular user tend to stay in the same bucket among the bottom-level buckets corresponding to the minimized log gap cost of the vertices of the social graph. In some embodiments, instead of using all vertices, the system can calculate the social network metric regarding the vertices by sampling a number of representative vertices from the buckets of the social graph.

At block 430, the system swaps two buckets that are child nodes of a common parent node of the partitioning tree such that the social network metric regarding the vertices is further optimized. Similarly, the assessment of the social network metric during the swapping step can be calculated by sampling a number of representative vertices from the buckets of the social graph. The swapping step of block 430 can be repeated to swap more buckets for further optimization.

The system can further identify and move sub-optimal vertices. At block 435, the system identifies a sub-optimal vertex that falls into a first bucket based on a sub-optimal decision. At block 440, the system moves the sub-optimal vertex into a second bucket so that the social network metric regarding the vertices is further optimized. The first and second buckets belong to a section led by a common ancestor node within a predetermined number of levels. The identifying and moving steps of blocks 435 and 440 can be repeated to move more vertices for further optimization.

If the system receives an instruction to add a new user to the social graph, the system can conduct the following steps to update the partitioning tree and alternative user IDs: receiving an instruction to add a new vertex representing a new user to the social graph; adding the new vertex to a last bucket of the bottom-level buckets of the partitioning tree; re-generating a new partitioning tree using the bottom-level buckets including the new vertex as initialization; and assigning new user IDs to the vertices of the social network in a numerical sequence based on the ordering of the bottom-level buckets of the new partitioning tree.

At block 445, the system assigns alternative user IDs to the vertices of the social network in a numerical sequence based on the ordering of the bottom-level buckets. The alternative user IDs are different from original user IDs that are assigned to the social network users when accounts of the social network users are created. The original user IDs having no relevance or correlation with relationships between vertices of the social graph. The alternative user IDs of similar or related users are close to each other.

At block 450, the system stores the social graph data of the users in storage locations in an order according to the numeral sequence of the assigned user IDs of the vertices.

At block 455, the system responds to a social graph data request for a list of requested users by retrieving social graph data of the requested users together from storage locations that are close to each other. The requested users are related users who have been assigned the user IDs that are close to each other. In some embodiments, the social graph data of at least two of the requested users are stored in a common block of one of the storage devices (e.g., flash memory devices).

In some embodiments, the process 400 can be applied to a method for improving data compression efficiency of a social network system as well. The social graph data of the users can be stored in storage locations in an order according to the numeral sequence of the assigned user IDs of the vertices. The social graph data of the users are stored in a form of differences between the social graph data of respective users and the social graph data of neighboring users. For example, a respective user and a neighboring user are fiends in the social network. The storage space taken by the respective user is less because the difference between the social graph data of the respective user and the social graph data of the neighboring user is small.

Sample Test Runs and Results

In some embodiments, the social graph reordering system relabels the vertices in the social graph such that a given objective function over the edges in the graph is minimized. One of the main objective functions that the social graph reordering system can optimize is the number of bits required to represent the each edge of the social graph, if the system difference-encodes each vertex's adjacency list. The system optimizes the labeling of the vertices so that a given vertex's neighbors are split into as few groups as possible, with vertices in a group having relatively close labels (e.g., alternative IDs). The size of the group can be determined by storing the social graph data of the group in a single database server. Thus, the system minimizes the cache miss rate when performing an operation to retrieve social graph data for a particular vertex's neighbors.

The optimization by relabeling the vertices can improve efficiency of operations beyond retrieving social graph data for a particular vertex's neighbors. For example, a social graph includes many users who are audiences of advertisements. The social graph can be, e.g., part of a large CPU-bound in-memory query engine for advertisers. The query engine allows advertisers to specify filters and group-by operations over users in order to discover user counts regarding how particular features and demographics are distributed. The reordering scheme can help to improve the memory locality when performing the group-by operations, and thereby improve the CPU and memory utilization of the system.

The social network system needs to simultaneously access social graph data of large sets of socially similar users. By reordering the vertices in the social graph using alternatively IDs, the system can quickly calculate the number of users of a social graph who are specified by a set of filters. For example, the system can quickly return a result for "select count(*) where country=US and age>=35 and age<=40." The system can further perform further aggregate operations such as "group by" on the results. The reordering works well for the social graph of advertisement audiences, because the advertisement audiences tend to have social or geographical components that the reordering can exploit. The assumption is that socially similar users have a similar attribute set in the social network. In other words, the social network has a high assortativity or homophily.

The system first determines one or more user attributes for social graph partitioning and indexing. Then the system stores the mapping relationships between the users and the determined user attributes. In order to reduce cache miss rate in the system, the system can store each attribute as a separate index in memory, with the value for user I being held at position I in the indexing. The original user IDs can be completely random or random with some correlation with geographic properties. In other words, the vertices stored in each data shard effectively form a random subgraph of the entire social graph. Now the system reorders the social graph data using alternative user IDs, in order to store data of users with similar attributes close together. The reordering will help reduce the cache miss rate during the group-by, if the rows of data being grouped are closer than in the ordering of the original user IDs.

When the social graph data are ordered and stored based on the original user IDs, a user is assigned to a random data shard which stores the social graph data of the user (random sharding). Random sharding means that as the number of shards grows, the portion of the social graph (subgraph) stored in a particular shard becomes sparser. For example, a social graph can have users who have an average number of 200 friends, and system uses 1024 shards to store the social graph data. The expectation that friends of a user are in the same shard with the user is 200*(1/102[4), which is significantly less than 1.

In that case, there are very few edges remaining in the subgraph. A sparser subgraph with very few edges will not provide any cache improvement even if the system reorder the social graph data within the subgraph. Instead, the system globally reorder the social graph data of users by adopting an alternative user ID scheme for the entire social graph, and storing the social graph data across the data shards based on the numeral sequence of the alternatively user IDs. Even though a user might not have many friends in the same shard, other socially similar users in the shard will have IDs numerally close to the ID of that user.

By reordering the entire social graph based on the structure of the friend relationships, the system takes advantage of that fact that friendships are highly assortative. Social network users tend to be friends with people that are quite similar to these users. Therefore, by adopting an alternative user ID scheme wherein users with similar attributes have close alternative IDs, the system places social graph data of users that are likely to be selected by expensive "group-by" operations close together, in order to minimize the number of cache-misses the system incurs during the group-by operations.

In one example, queries were performed on a social group ordered by original IDs, the same social group ordered by alternative IDs, and the same social group ordered by alternative IDs generated based on top filter columns (e.g., country, gender, etc.). The query engine performs filters on each column independently. In order words, previous filters' results are not chained into subsequent filters within the same query.

In one example, there is a reasonable 5% improvement in runtime, comparing the social group ordered by original IDs with the same social group ordered by alternative IDs. The level 1, level 2, and level 3 cache miss rates are reduced by 18%, 14% and 30% respectively. In addition, there is a 11% improvement in runtime, comparing the social group ordered by original IDs with the same social group ordered by alternative IDs generated based on top filter columns. The level 1, level 2, and level 3 cache miss rates are reduced by 25%, 30% and 60% respectively.

These results provide several insights. First, because generally the original IDs are randomly assigned, ordering by alternative IDs based on any attribute can improve the performance over the original ordering by the original IDs. Second, the system can further optimize performance of certain operations, by adopting an alternative ID scheme based on attributes that are relevant to these operations. For example, if the goal is to optimize the performance of the group-by operations, the system can adopt an alternative ID scheme based on the attributes of the filter columns of these group-by operations.

In some embodiments, the system can optimize particular operations using the alternative ID scheme. For example, an advertiser is interested in targeting friends of a given audience that includes users who have purchased a product of the advertiser. With the original ordering of social graph data based on random original IDs, the system that performs group-by operations over the friends of the audience will likely hit most (if not all) shards for storing data of the entire social graph and access a potentially random set of cache in each shard. The system will suffer from high latency, since the latency is dictated by the shard with lowest hit rate.

The system can improve by adopting an alternative user ID scheme, which minimizes the average number of partitions any given user has to hit in order to fetch data for all his friends. The system records the shard storage of social graph data based on the alternative user IDs. As the social graph data are no longer stored in shards based on a random sequence, many friend-edges of the social graph reside within a single shard. Therefore, when many queries target friends of a given set of users, the system can directly minimize the cache misses when fetching groups of friends, since they tend to be stored together.

The system can parse the attribute data for a given shard ordered by both original IDs and alternative IDs. The efficiency of an ordering scheme can be measured by the distribution of gaps induced by a filter. For example, a filter like "select count(*) where country=US" will select some users out of the users in the shard. The gaps induced by this filter are the differences in position between elements matched by the filter. A high quality ordering should produce more small gaps than a random or poor ordering. The alternative ID scheme produces higher quality results for attributes such as country, education level and age.

Figure 5:
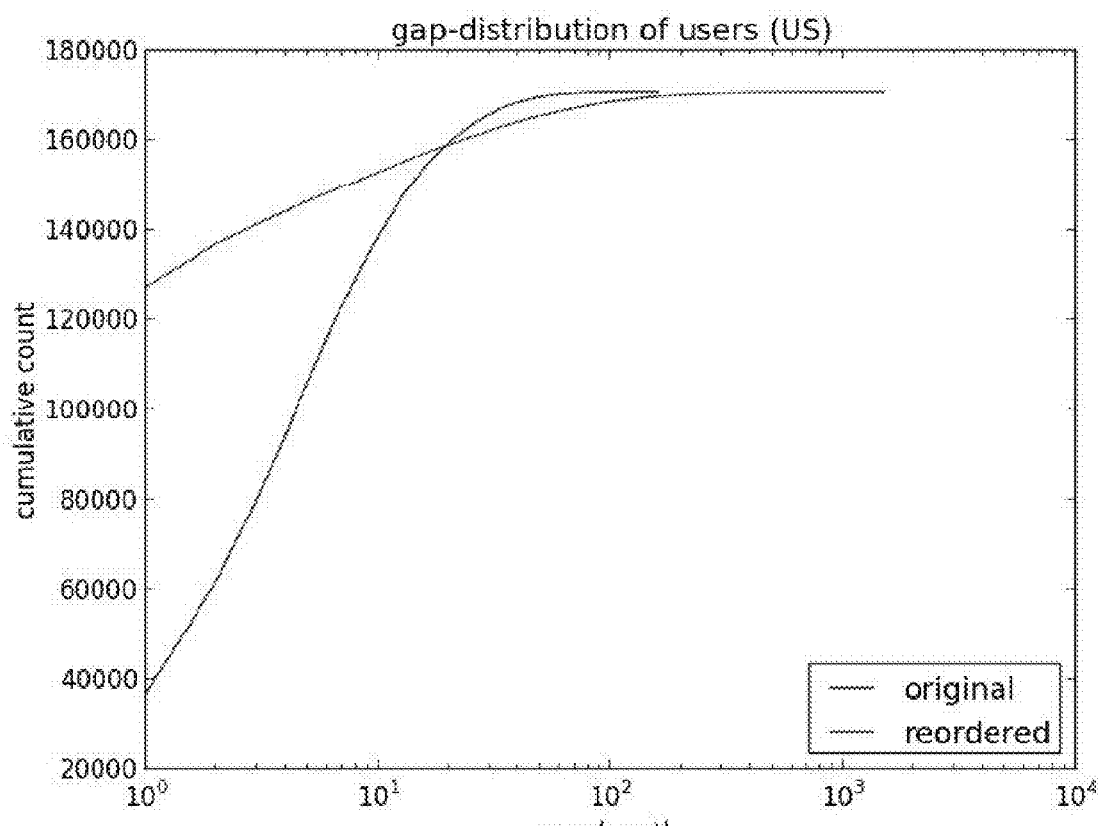
FIG. 5 is a graph illustrating the gap-distribution of users in U.S. for the original ID scheme and the reordered alternative ID scheme.

For example, FIG. 5 illustrates the gap-distribution of users in U.S. for the original ID scheme and the reordered alternative ID scheme. As FIG. 5 shows, the reordered alternative ID scheme has much more small gaps and much less large gaps as compared to the original ID scheme. In other words, in the reordered alternative ID scheme, the users qualified under the same filter (e.g., socially similar users) tend to have closer locations in the data shard, comparing to the original ID scheme.

One way to interpret the query results is in terms of cache-miss rates. Assuming the cache line size is k bytes, and the system stores b bytes per key in the attribute's column, $x=k/b$ attributes will fit in a single cache line. Gaps above the point of $x=k/b$ are users with a gap greater than $k/b$. These gaps above the point will incur a cache-miss when the social graph data are being fetched. In FIG. 5, the curve for the reordered alternative ID scheme has significantly more mass at $x=k/b$ than the curve for the original ID scheme. Then the alternative ID scheme based ordering will incur fewer cache-misses than the original ID scheme.

Figure 6:
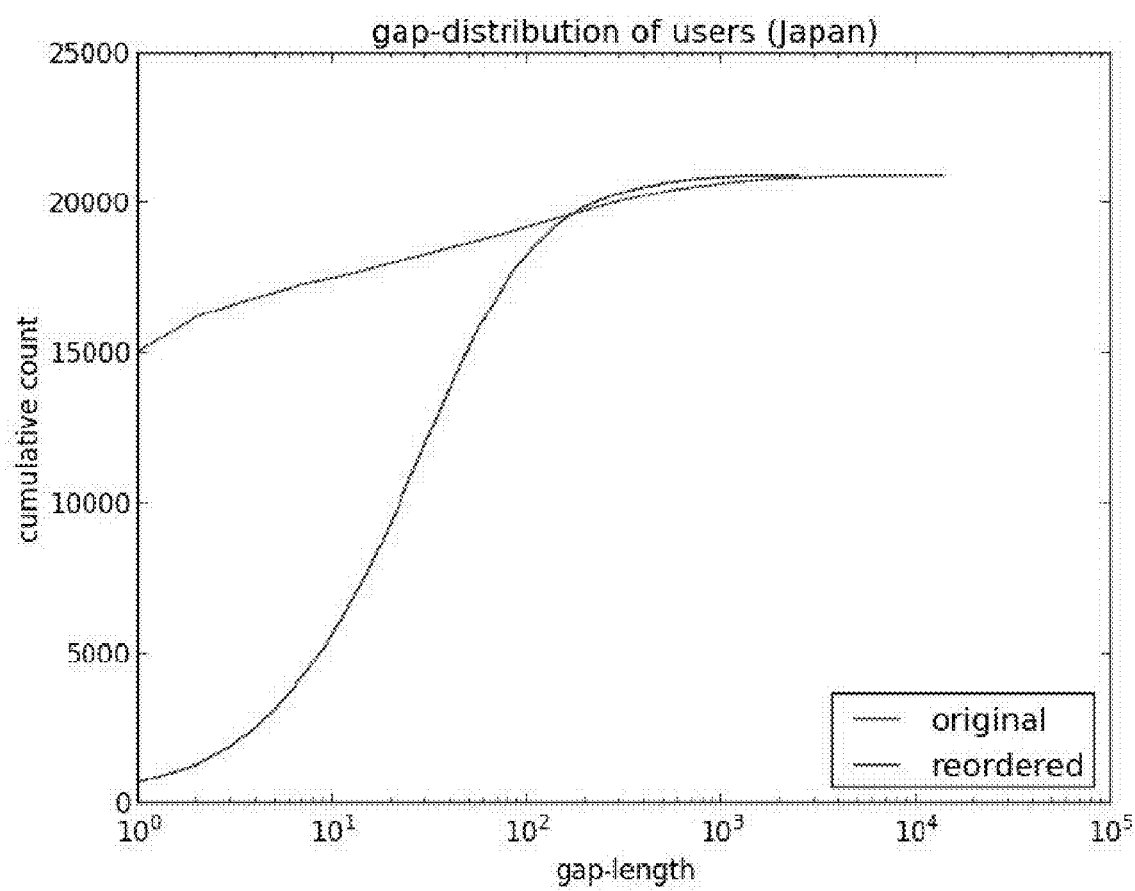
FIG. 6 is a graph illustrating the gap-distribution of users in Japan for the original ID scheme and the reordered alternative ID scheme.

Similarly, FIG. 6 illustrates the gap-distribution of users in Japan for the original ID scheme and the reordered alternative ID scheme. The reordered alternative ID scheme has much more small gaps and much less large gaps as compared to the original ID scheme. FIG. 6 suggests that in the reordered alternative ID scheme, the users qualified under the same filter (e.g., socially similar users) tend to have closer locations in the data shard, as compared to the original ID scheme.

In some embodiments, the system parses a sampled subset of 10 k real queries for a social graph of a large query engine for advertisers. To investigate the gap distributions, the results include denormalized columns (user→behavior, user→custom audience, and user→interest). For example, one sample query is "select ship, count(user) where country in (1) and ca in (6016641411161, 6019131361961) and relations." The system produces gap-distributions for sample query, and aggregates them together to form a single distribution. The percentage of gaps above a given size can be plotted, as a function of the gap-size.

Figure 7:
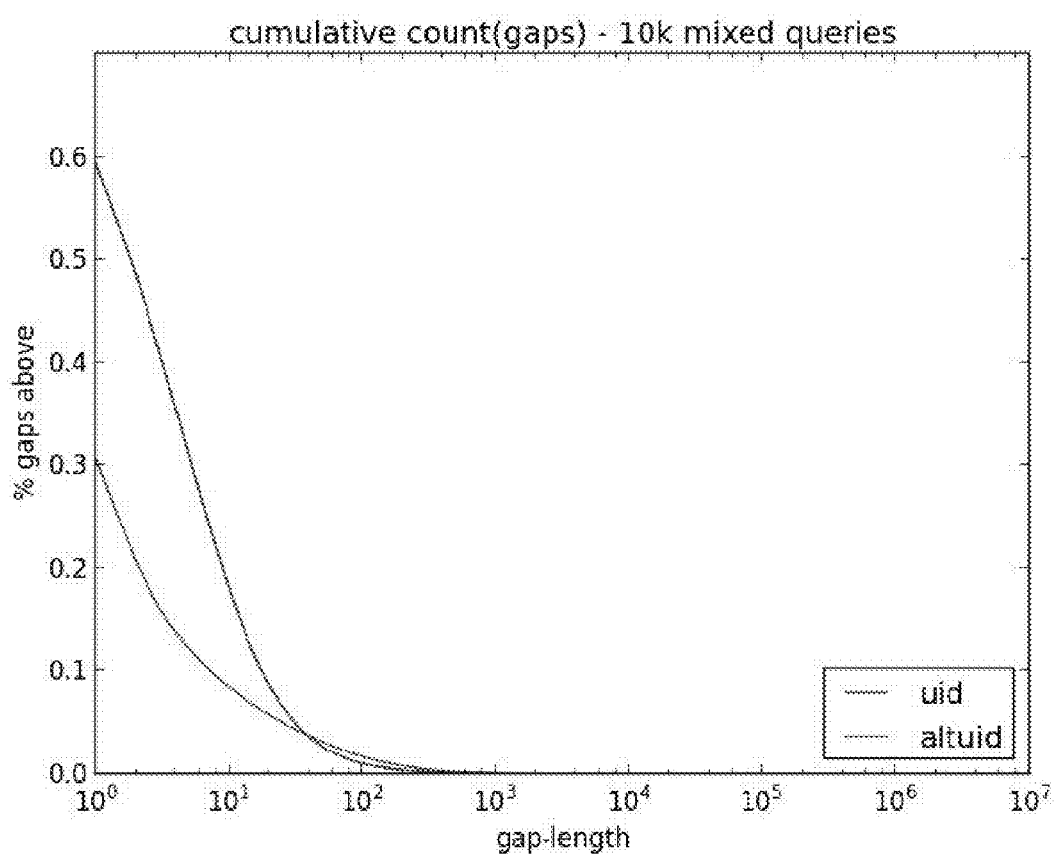
FIG. 7 is a graph illustrating the cumulative distribution of gaps for all 10 k queries in an example.
Figure 8:
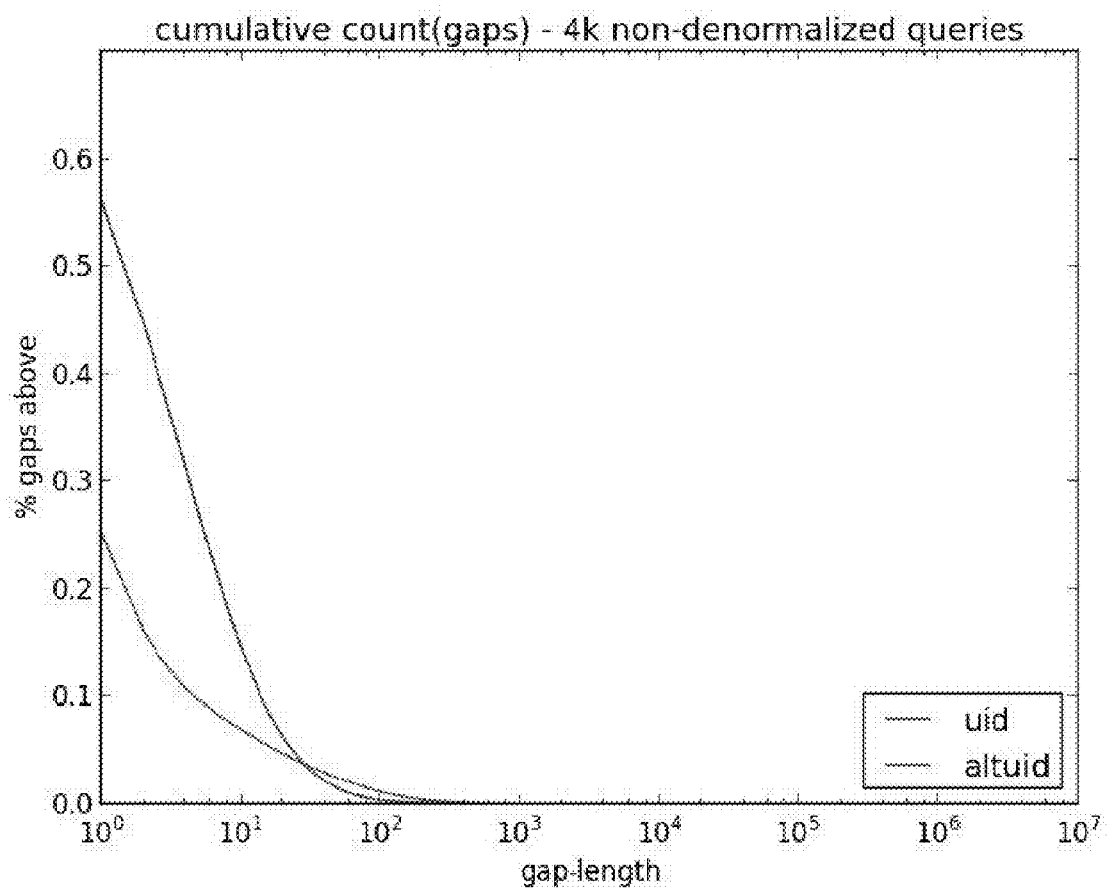
FIG. 8 is a graph illustrating the cumulative distribution of gaps for queries operating only on normalized columns in the example.

FIG. 7 illustrates the cumulative distribution of gaps for all 10 k queries in an example. FIG. 8 illustrates the cumulative distribution of gaps for queries operating only on normalized columns in the example. In other words, the columns in FIG. 8 excludes denormalized columns such as user→behavior, user→custom audience, and user→interest, user→page.

Assuming a cache line is k bytes long and an index that stores b bytes per key, a single cache line can store x=k/b values. Taking the y-value at x=k/b directly produces the cache-miss rate for the plots of FIGS. 7 and 8. Table 1 shows the estimated miss rates for the original ID scheme (UID) and the alternative ID scheme (AltUID).

TABLE I

Estimated Miss Rates for UID/AltUID

| Element Size | Denormalized UID | Denormalized AltUID | Normalized UID | Normalized AltUID |
|---|---|---|---|---|
| 8 bytes (long) | 21.857% | 9.480% | 18.198% | 7.727% |
| 4 bytes (int) | 11.150% | 6.582% | 8.448% | 5.440% |
| 1 bit (bitmap) | 1.902% | 2.580% | 0.915% | 1.930% |

As Table 1 discloses, the alternative ID scheme performs better when storing more bytes/value. Both element sizes of long and int, there is a decrease of 50% in cache-miss rate when the alternative ID scheme replaces the original ID scheme. When the element size reaches 1 bit (e.g., bitmap), there is little advantage of the alternative ID scheme over the original ID scheme.

Therefore, the ordering of social graph data based on the alternative ID scheme can significantly decrease the cache-miss rate for uncompressed indices. Attributes such as country, education level, and age can become significantly more clustered in the reordered index. The system can improve space utilization on indices stored as bitsets (e.g., as a way of compression).

Figure 9:
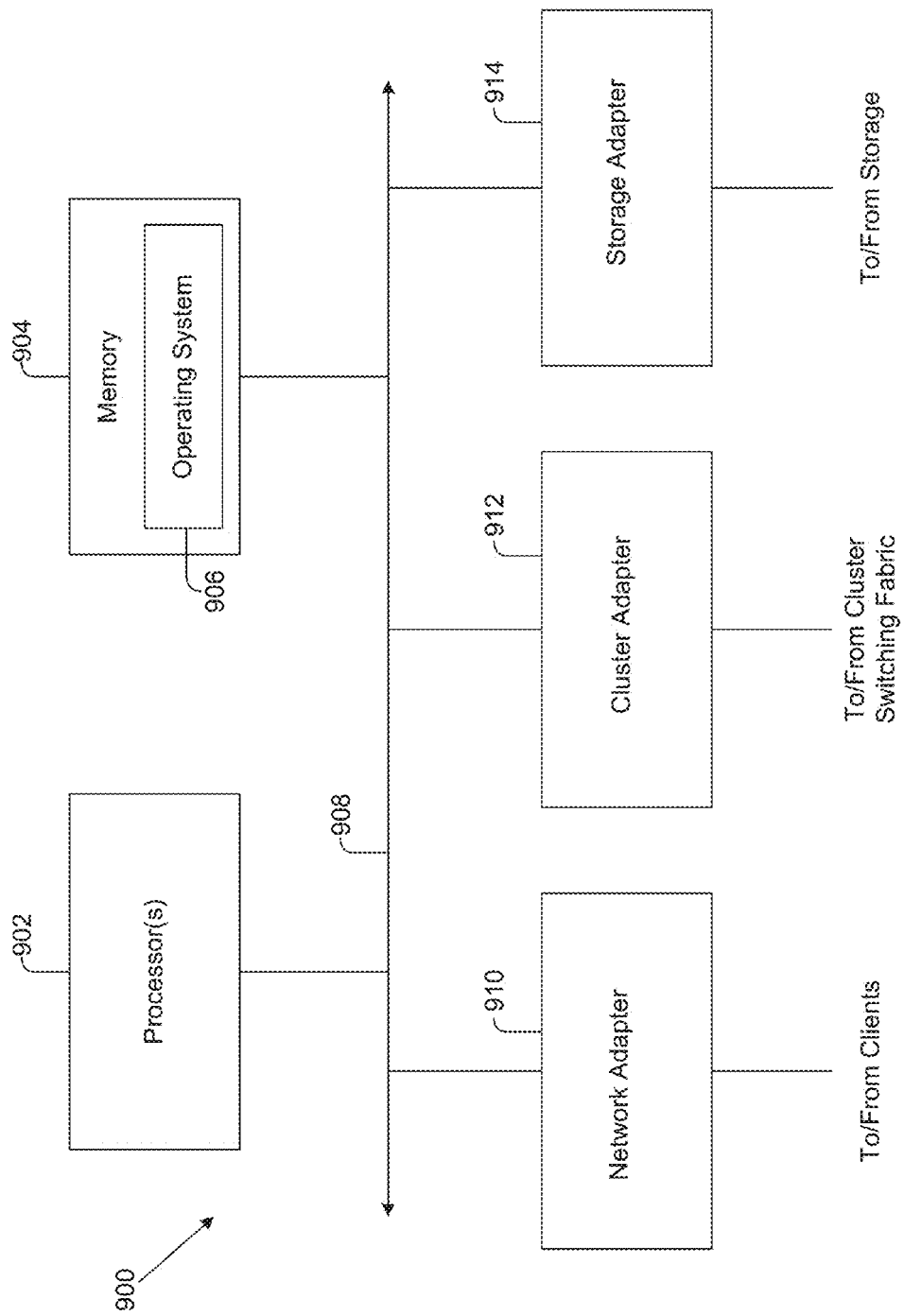
FIG. 9 is a high-level block diagram illustrating an example of a hardware architecture of a computing device that performs disclosed processes, in various embodiments.

FIG. 9 is a high-level block diagram illustrating an example of a hardware architecture of a computing device 900 that performs the above process, in various embodiments. The computing device 900 executes some or all of the processor executable process steps that are described below in detail. In various embodiments, the computing device 900 includes a processor subsystem that includes one or more processors 902. Processor 902 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 900 can further include a memory 904, a network adapter 910, a cluster access adapter 912 and a storage adapter 914, all interconnected by an interconnect 908. Interconnect 908 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 912 includes one or more ports adapted to couple the computing device 900 to other devices. In the illustrated embodiment, Ethernet can be used as the clustering protocol and interconnect media, although other types of protocols and interconnects may be utilized within the cluster architecture described herein.

The computing device 900 can be embodied as a single- or multi-processor storage system executing a storage operating system 906 that can implement a high-level module, e.g., a storage manager, to logically organize the information as a hierarchical structure of named directories, files and special types of files called virtual disks at the storage devices. The computing device 900 can further include graphical processing unit(s) for graphical processing tasks or processing non-graphical tasks in parallel.

The memory 904 can comprise storage locations that are addressable by the processor(s) 902 and adapters 910, 912, and 914 for storing processor executable code and data structures. The processor 902 and adapters 910, 912, and 914 may, in turn, comprise processing elements and/or logic circuitry configured to execute the software code and manipulate the data structures. The operating system 906, portions of which is typically resident in memory and executed by the processors(s) 902, functionally organizes the computing device 900 by (among other things) configuring the processor(s) 902 to invoke. It will be apparent to those skilled in the art that other processing and memory implementations, including various computer readable storage media, may be used for storing and executing program instructions pertaining to the technology.

The network adapter 910 can include multiple ports to couple the computing device 900 to one or more clients over point-to-point links, wide area networks, virtual private networks implemented over a public network (e.g., the Internet) or a shared local area network. The network adapter 910 thus can include the mechanical, electrical and signaling circuitry needed to connect the computing device 900 to the network. Illustratively, the network can be embodied as an Ethernet network or a Fibre Channel (FC) network. A client can communicate with the computing device over the network by exchanging discrete frames or packets of data according to pre-defined protocols, e.g., TCP/I P.

The storage adapter 914 can cooperate with the storage operating system 906 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 914 can include multiple ports having input/output (I/O) interface circuitry that couples to the disks over an I/O interconnect arrangement, e.g., a conventional high-performance, Fibre Channel (FC) link topology. In various embodiments, the cluster adapter 912 and the storage adapter 914 can be implemented as one adaptor configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for improving storage efficiency of a social network system, comprising:
   receiving an instruction to improve cache or memory efficiency of social graph data of a social graph, wherein the social graph includes multiple vertices representing social network users and some of the social network users are friends in a social network;
   generating, based on the social graph, a partitioning tree including multiple bottom-level buckets, the partitioning tree dividing the vertices of the social graph into the bottom-level buckets and ordering the bottom-level buckets such that a social network metric corresponding to the vertices is optimized;
   assigning user identities (IDs) to the vertices of the social network in a numerical sequence based on the ordering of the bottom-level buckets;
   storing the social graph data of the users in storage locations in a storage device in an order according to the numeral sequence of the assigned user IDs of the vertices; and
   responding to a social graph data request for a list of requested users by retrieving social graph data of the requested users together from storage locations that are close to each other in the storage device, wherein the requested users are related users who have been assigned the user IDs that are close to each other.

2. The method of claim 1, wherein the partitioning tree divides the vertices of the social graph into the bottom-level buckets and orders the bottom-level buckets such that a log cost of the vertices of the social graph is minimized, the log cost being the social network metric.

3. The method of claim 2, wherein at least some of vertices representing friend users are in the same bucket among the bottom-level buckets corresponding to the minimized log cost of the vertices of the social graph.

4. The method of claim 1, wherein the partitioning tree divides the vertices of the social graph into the bottom-level buckets and orders the bottom-level buckets such that a log gap cost of the vertices of the social graph is minimized, the log gap cost being the social network metric.

5. The method of claim 4, wherein vertices representing friends of a particular user tend to stay in the same bucket among the bottom-level buckets corresponding to the minimized log gap cost of the vertices of the social graph.

6. The method of claim 1, wherein the social graph data of the vertices are stored in blocks of storage devices, and wherein the size of the bottom-level blocks of the partitioning tree is substantially equal to or less than a block size of the blocks of the storage devices.

7. The method of claim 6, wherein said retrieving social graph data comprises:
   retrieving social graph data of the requested users together from storage locations that are close to each other, wherein the social graph data of at least two of the requested users are stored in a common block of one of the storage devices.

8. The method of claim 1, wherein said assigning user IDs to the vertices of the social network comprises:
   assigning alternative user IDs to the vertices of the social network in a numerical sequence based on the ordering of the bottom-level buckets;
   wherein the alternative user IDs are different from original user IDs that are assigned to the social network users when accounts of the social network users are created, the original user IDs having no relevance or correlation with relationships between vertices of the social graph.

9. The method of claim 1, wherein said generating based on the social graph a partitioning tree comprises:
   recursively dividing the social graph into buckets of vertices such that the social network metric regarding the vertices is optimized, the buckets being nodes of the partitioning tree;
   determining that bottom-level buckets of the partitioning tree reach a desired level of granularity; and
   stopping further divisions of the social graph.

10. The method of claim 9, wherein the partitioning tree is a binary partitioning tree, and the nodes of the binary partitioning tree have two branches respectively.

11. The method of claim 1, further comprising:
    swapping two buckets that are child nodes of a common parent node of the partitioning tree such that the social network metric regarding the vertices is further optimized.

12. The method of claim 1, wherein the social network metric regarding the vertices is calculated by sampling a number of representative vertices from the buckets of the social graph.

13. The method of claim 1, further comprising:
    identifying a sub-optimal vertex that falls into a first bucket based on a sub-optimal decision; and
    moving the sub-optimal vertex into a second bucket so that the social network metric regarding the vertices is further optimized;
    wherein the first and second buckets belong to a section led by a common ancestor node within a predetermined number of levels.

14. The method of claim 1, further comprising:
    receiving an instruction to add a new vertex representing a new user to the social graph;
    adding the new vertex to a last bucket of the bottom-level buckets of the partitioning tree;
    re-generating a new partitioning tree using the bottom-level buckets including the new vertex as initialization; and assigning new user IDs to the vertices of the social network in a numerical sequence based on the ordering of the bottom-level buckets of the new partitioning tree.

15. A non-transitory machine-readable storage medium comprising a program containing a set of instructions for causing a machine to execute procedures for improving data compression efficiency of a social network system, the procedures comprising:

receiving an instruction to improve data compression efficiency of social graph data of a social graph, the social graph including multiple vertices representing social network users, some of the social network users are friends in a social network;

generating based on the social graph a partitioning tree including multiple bottom-level buckets, the partitioning tree dividing the vertices of the social graph into the bottom-level buckets and ordering the bottom-level buckets such that a social network metric regarding the vertices is optimized;

assigning user IDs to the vertices of the social network in a numerical sequence based on the ordering of the bottom-level buckets; and storing the social graph data of the users in storage locations in an order according to the numeral sequence of the assigned user IDs of the vertices, wherein the social graph data of the users are stored in a form of differences between the social graph data of respective users and the social graph data of neighboring users.

16. The non-transitory machine-readable storage medium of claim 15, wherein a respective user and a neighboring user are friends in the social network, and the storage space taken by the respective user is less because the difference between the social graph data of the respective user and the social graph data of the neighboring user is small.

17. The non-transitory machine-readable storage medium of claim 15, further comprising:

responding to a social graph data request for a list of requested users by retrieving social graph data of the requested users together from storage locations that are close to each other, wherein the requested users are related users who have been assigned the user IDs that are close to each other.

18. The non-transitory machine-readable storage medium of claim 15, wherein the partitioning tree divides the vertices of the social graph into the bottom-level buckets and orders the bottom-level buckets such that a log cost or a log gap cost of the vertices of the social graph is minimized.

19. A computing device, comprising:

a networking interface configured for receiving a social graph data request;

one or more storage devices configured to store social graph data of a social graph, the social graph including multiple vertices representing social network users, some of the social network users are friends in a social network;

a partition tree module configured to generate based on the social graph a partitioning tree including multiple bottom-level buckets, the partitioning tree dividing the vertices of the social graph into the bottom-level buckets and ordering the bottom-level buckets such that a social network metric regarding the vertices is optimized;

a reordering module configured to assign user IDs to the vertices of the social network in a numerical sequence based on the ordering of the bottom-level buckets, wherein at least one of the storage devices stores the social graph data of the users in storage locations in an order according to the numeral sequence of the assigned user IDs of the vertices; and a response module configured to respond to the social graph data request for a list of requested users by retrieving social graph data of the requested users together from storage locations that are close to each other, wherein the requested users are related users who have been assigned the user IDs that are close to each other.

* * * * *

UNITED STATES PATENT AND TRADEMARK OFFICE
CERTIFICATE OF CORRECTION

PATENT NO. : 10,025,867 B2
APPLICATION NO. : 14/869656
DATED : July 17, 2018
INVENTOR(S) : Kabiljo et al.

Page 1 of 1

It is certified that error appears in the above-identified patent and that said Letters Patent is hereby corrected as shown below:

In the Claims

In Column 15, Line 48, Claim 1, delete "the numeral" and insert -- the numerical --, therefor.

In Column 17, Line 24, Claim 15, delete "numeral sequence" and insert -- numerical sequence --, therefor.

In Column 18, Line 30, Claim 19, delete "the numeral" and insert -- the numerical --, therefor.

Signed and Sealed this
Thirteenth Day of November, 2018

Andrei Iancu
*Director of the United States Patent and Trademark Office*